(No Model.)
J. F. MOORE.
HAY RACK.
No. 479,826. Patented Aug. 2, 1892.
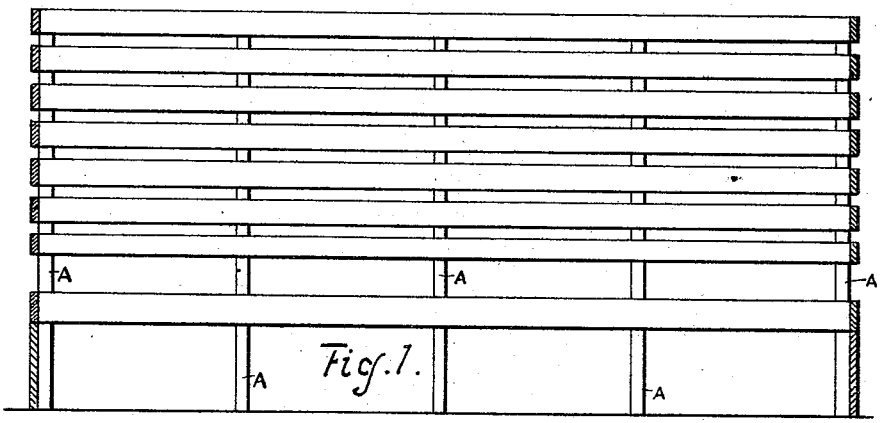
Fig. 1.
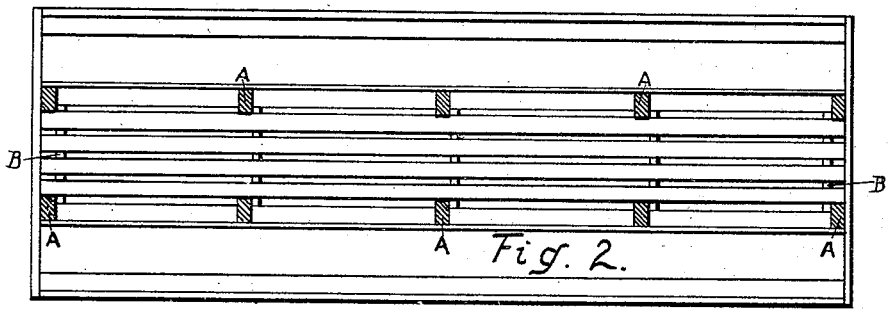
Fig. 2.
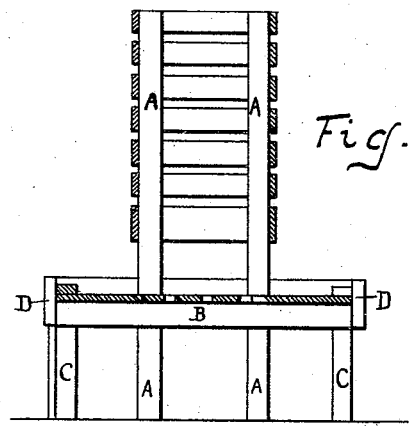
Fig. 3
WITNESSES:
d. Vierbuchen
W. C. Vierbuchen.
INVENTOR
John F. Moore
BY 
ATTORNEY.

UNITED STATES PATENT OFFICE.

JOHN F. MOORE, OF CROWELL, NEBRASKA.

HAY-RACK.

SPECIFICATION forming part of Letters Patent No. 479,826, dated August 2, 1892.

Application filed June 29, 1891. Serial No. 397,933. (No model.)

*To all whom it may concern:*

Be it known that I, JOHN F. MOORE, of Crowell, in the county of Dodge and State of Nebraska, have invented certain useful Improvements in a Combined Hay-Rack and Hog-Shed; and I do hereby declare that the following is a full, clear, and exact description of the invention, such as will enable others skilled in the art to which it appertains to make and use the same, reference being had to the accompanying drawings, which form a part of this specification.

This invention relates to a combined hay-rack and hog-house.

The object of this invention is to provide a simple device which shall be so constructed as to do service as a hay-rack and at the same time provide a hog-house, as will be described more fully hereinafter.

In the accompanying drawings, Figure 1 shows a side elevation of my combined hay-rack and hog-house; Fig. 2, a top view thereof, and Fig. 3 an end view thereof.

Similar letters of reference refer to corresponding parts.

A A represent a suitable number of uprights, which, if desired, may be pointed at their lower ends and driven into the ground. They are preferably placed in two parallel rows and secured a suitable distance above the ground by means of the transverse braces B B, one brace to each of the facing uprights, as will be understood by referring to the figures. These braces B B extend a suitable distance beyond the uprights and are secured at their ends by means of the double line of parallel posts C C. This framework is now closed upon three sides, preferably upon the east, west, and north sides, so as to form a suitable housing. Upon the top that portion without the extending uprights A A is provided with a solid deck, while that within said upright is latticed, as will be understood by referring to Fig. 2, the whole being secured by means of the sills D. The uprights are now cribbed, so as to form the rack, as illustrated. The rack immediately above the deck is sufficiently open that the cattle, which can easily reach over the deck, may pull the hay from out of the crib. Now as the cattle feed they continually agitate the contents, so that a great deal of hay, especially the short stalks, continually fall through the deck-openings and into the shed below. This of course forms a nice bedding, and, as the hay continually sifts through, needs no attention. It also forms a warm housing and makes itself noticeable because of its simplicity and utility.

Having thus described my said invention, what I claim as new, and desire to secure by United States Letters Patent, is—

The herein-described combined hog-house and hay-rack, comprising a lower housing closed upon three sides and having a solid deck provided with a central latticed portion extending longitudinally from end to end, in combination with a crib forming part of said housing and extending above said central latticed portion, so as to leave a suitable space between said deck and crib, said crib extending from said central latticed portion, the whole of said deck being surrounded by a guard, all substantially as and for the purpose set forth.

In testimony whereof I affix my signature in presence of two witnesses.

JOHN F. MOORE.

Witnesses:
JAMES L. BLACK,
GEO. W. SUES.